Sept. 1, 1953            B. H. WOODRUFF            2,650,990
CONTROL OF ELECTRICAL SUPPLY FOR DENTAL APPARATUS
Filed May 18, 1949            7 Sheets-Sheet 1
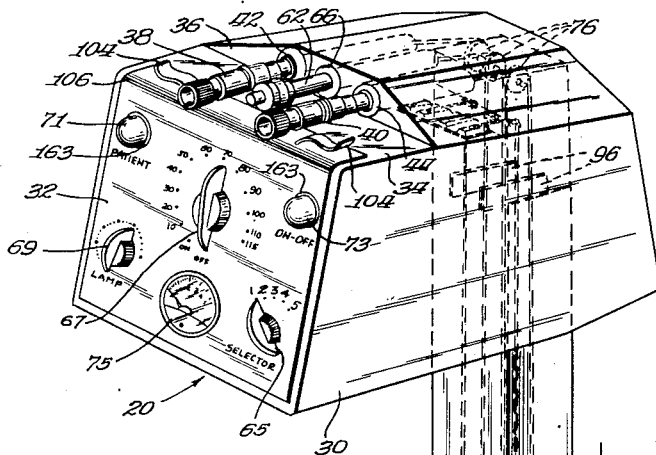
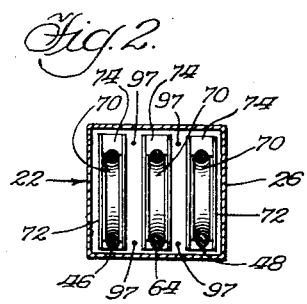
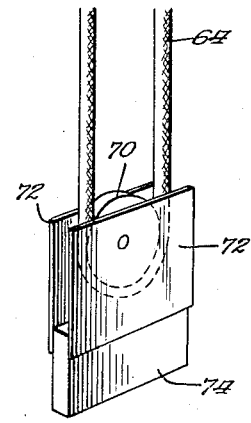
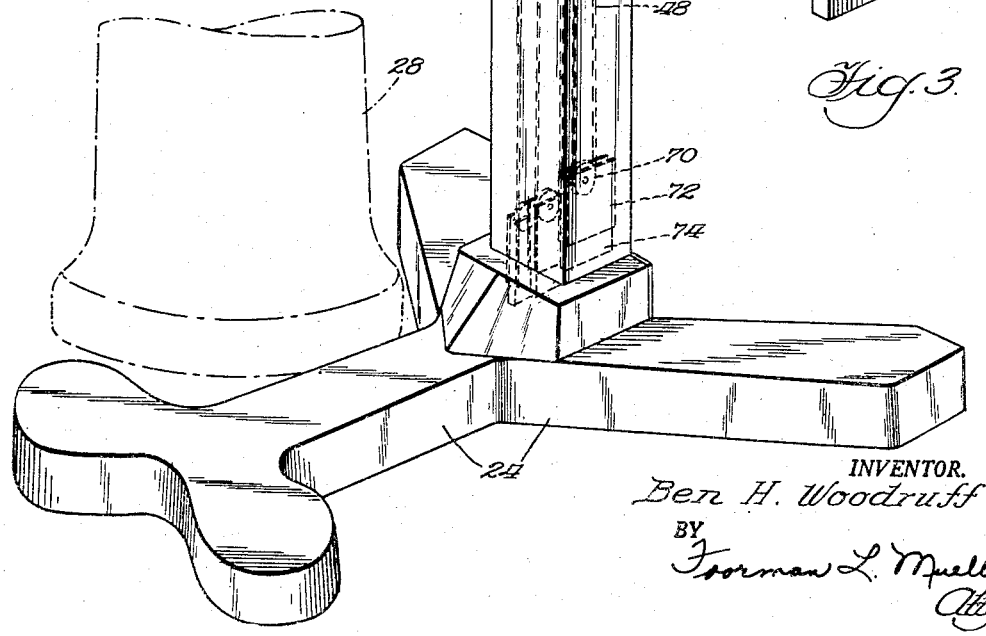
INVENTOR.
Ben H. Woodruff
BY Foorman L. Mueller
Atty.

Sept. 1, 1953  B. H. WOODRUFF  2,650,990
CONTROL OF ELECTRICAL SUPPLY FOR DENTAL APPARATUS
Filed May 18, 1949  7 Sheets-Sheet 2
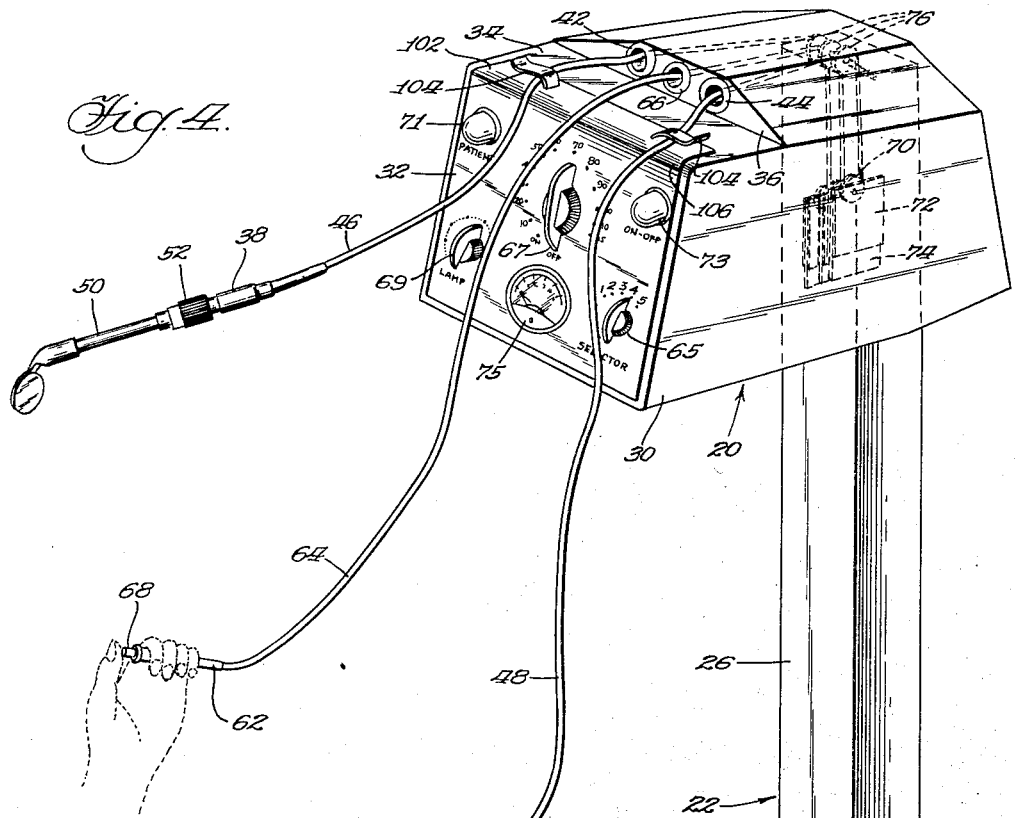
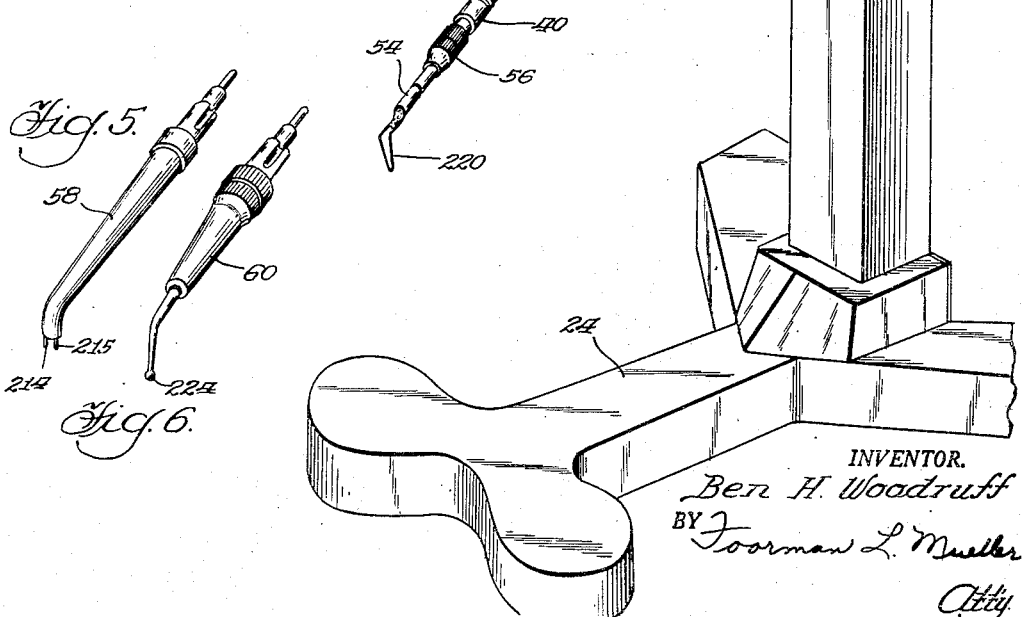
INVENTOR.
Ben H. Woodruff
BY Foorman L. Mueller
Atty Sept. 1, 1953  B. H. WOODRUFF  2,650,990
CONTROL OF ELECTRICAL SUPPLY FOR DENTAL APPARATUS
Filed May 18, 1949  7 Sheets-Sheet 3
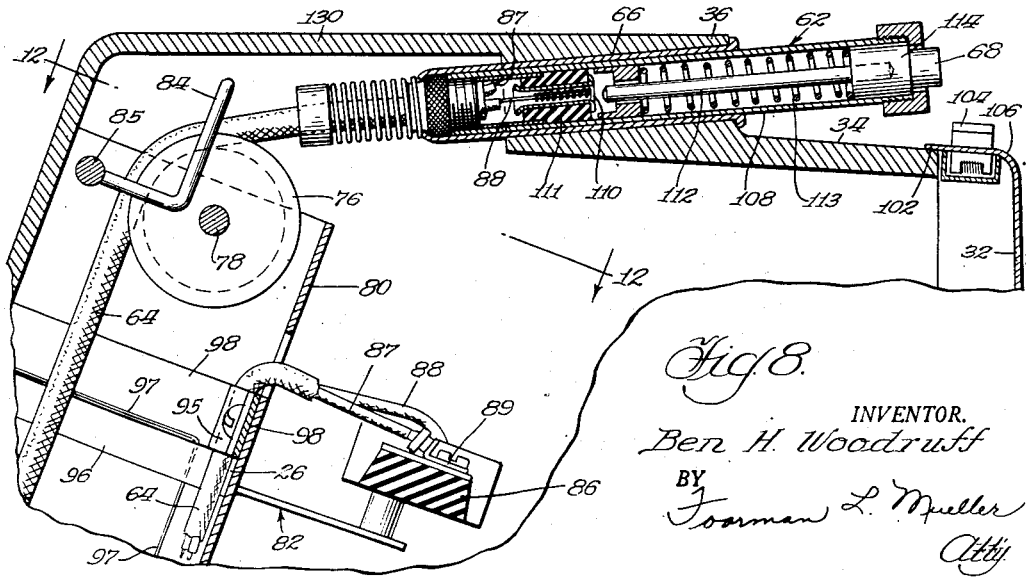
INVENTOR.
Ben H. Woodruff
BY
Foorman L. Mueller
Atty Sept. 1, 1953   B. H. WOODRUFF   2,650,990
CONTROL OF ELECTRICAL SUPPLY FOR DENTAL APPARATUS
Filed May 18, 1949   7 Sheets-Sheet 4
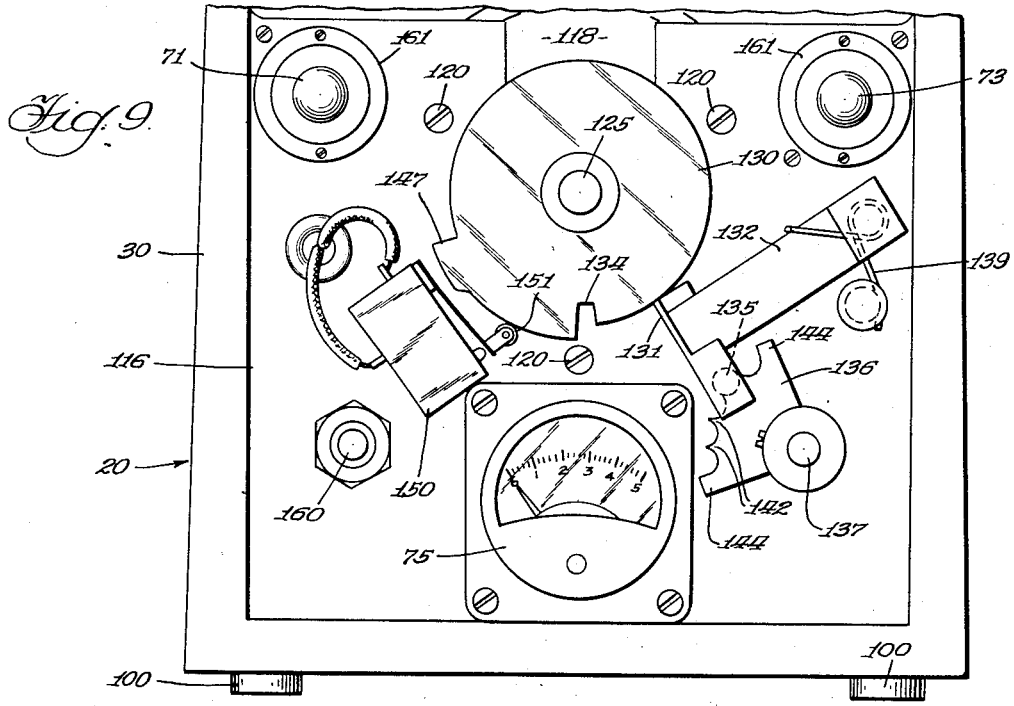
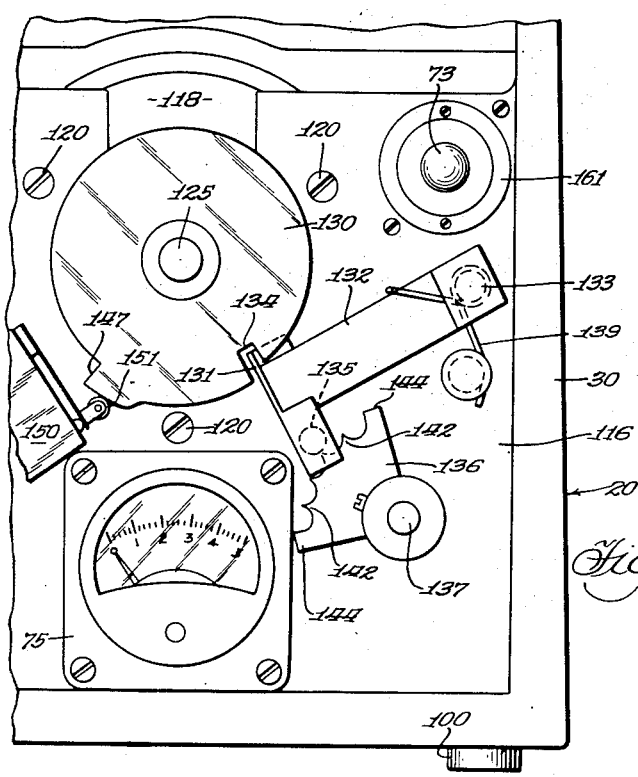
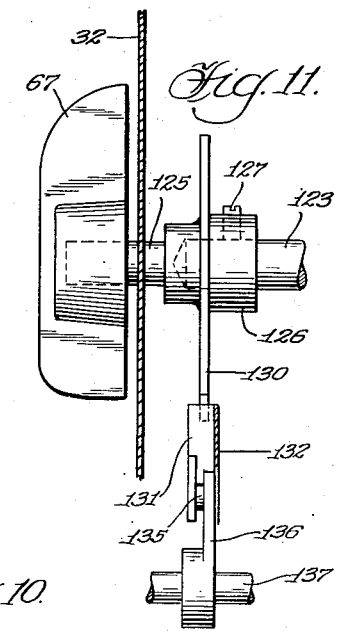
INVENTOR.
Ben H. Woodruff
BY Foorman L. Mueller
Atty Sept. 1, 1953 B. H. WOODRUFF 2,650,990
CONTROL OF ELECTRICAL SUPPLY FOR DENTAL APPARATUS
Filed May 18, 1949 7 Sheets-Sheet 5

INVENTOR.
Ben H. Woodruff
BY
Foorman L. Mueller
Atty.

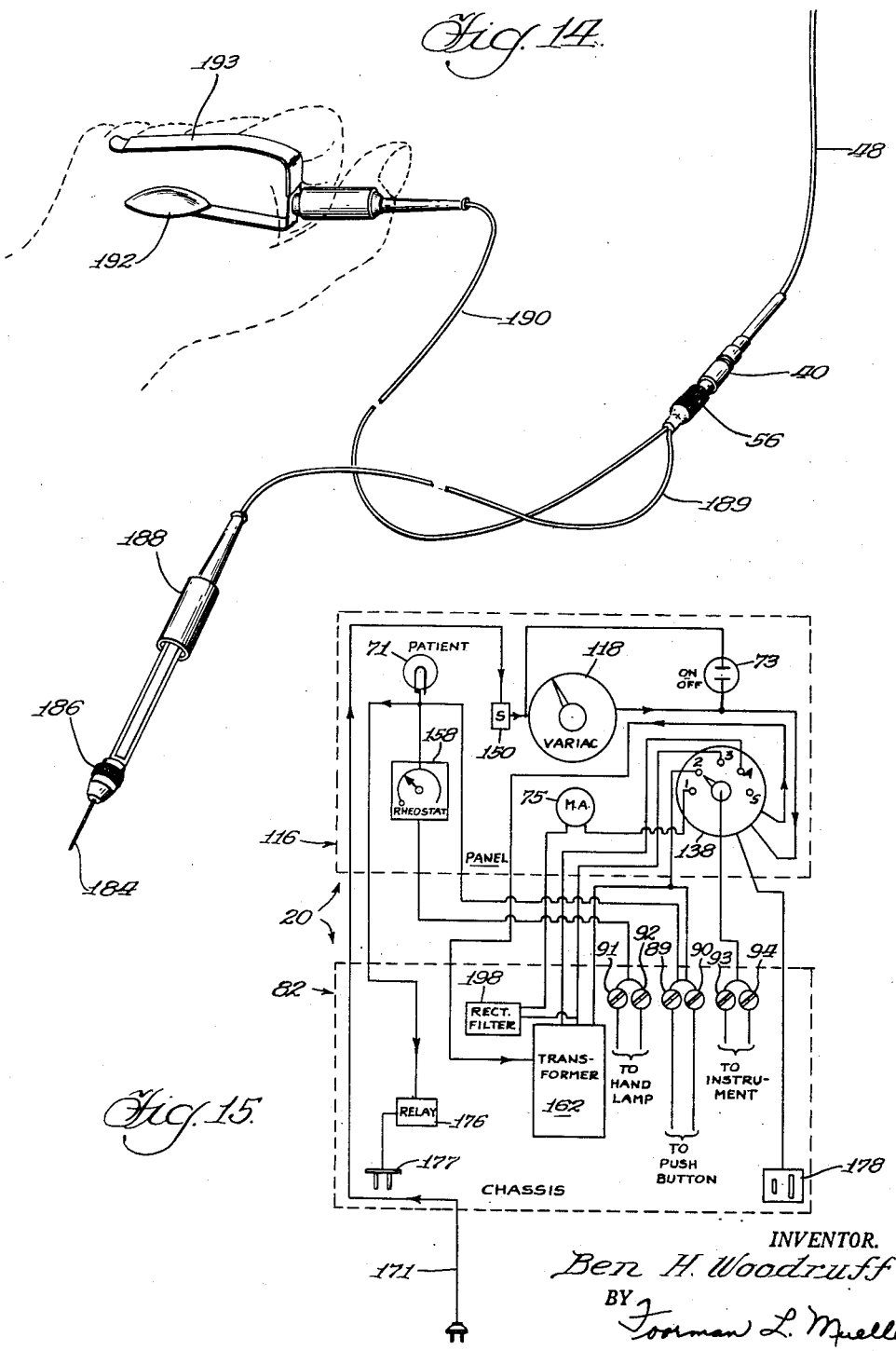

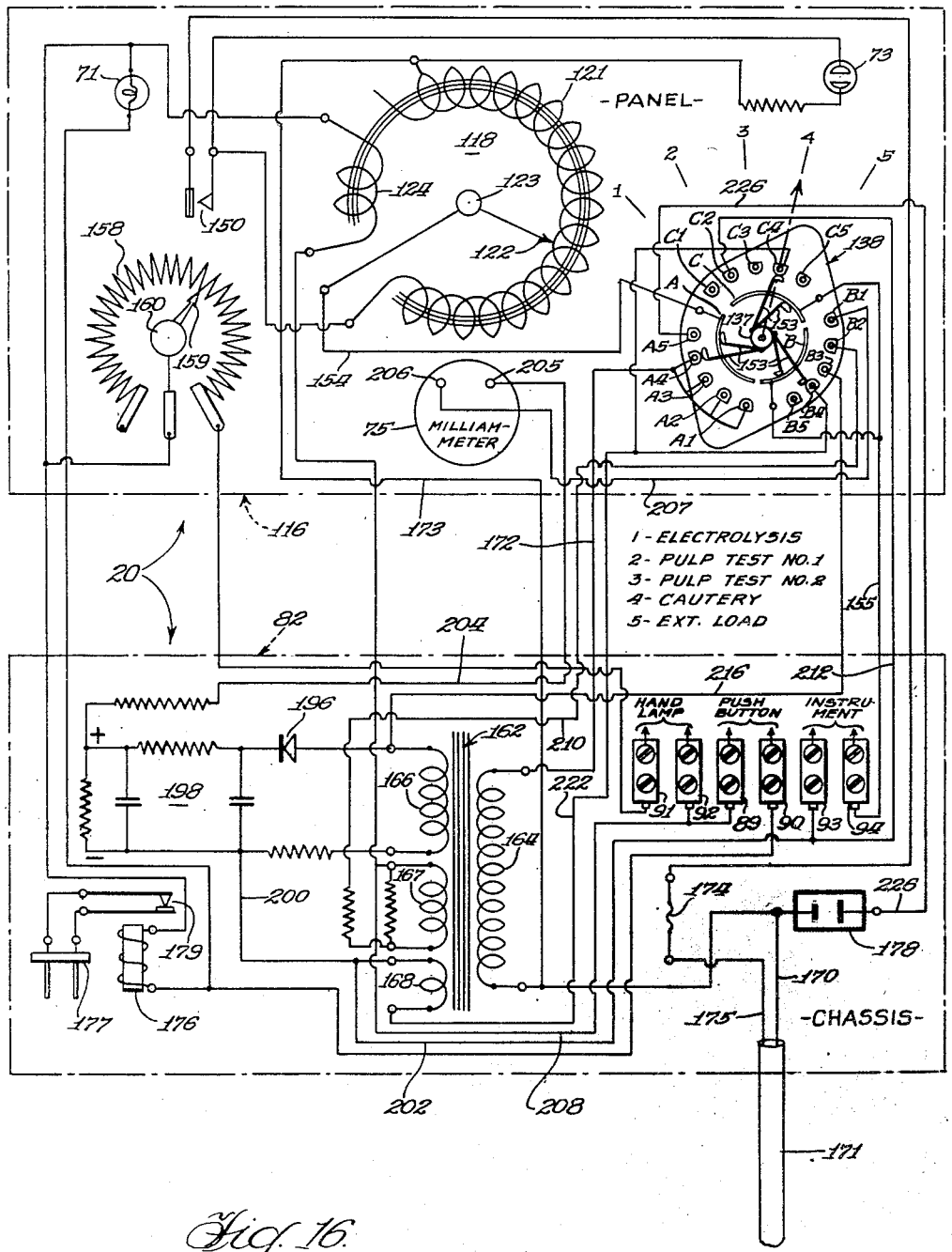

Patented Sept. 1, 1953

2,650,990

UNITED STATES PATENT OFFICE 2,650,990

CONTROL OF ELECTRICAL SUPPLY FOR DENTAL APPARATUS

Ben H. Woodruff, Chicago, Ill.

Application May 18, 1949, Serial No. 93,904

5 Claims. (Cl. 307—41)

1

This invention relates to improvements in dental apparatus for administering various electrical treatments such as oral cautery, tooth pulp testing and root canal electrolysis.

Standard dental installations do not always include facilities for administering certain frequently required electrical treatments. Such facilities usually are available only in the more expensive installations. Hence, in many cases, a dentist is not likely to equip his office with electrical cauterizing and testing apparatus until such time as he is in a position to afford a complete new installation. Meanwhile he must limit his operations and thereby handicap his practice. There is a definite need for auxiliary low-cost equipment adapted to administer electrical treatments orally, to supplement the standard installations in most dentists' offices.

Prior dental equipment for administering electrical treatments has been complicated by a multiplicity of controls, particularly voltage controls. In many instances these controls have not provided as high a degree of smooth variation as desired, resulting in unsatisfactory operation or discomfort to the patient. Moreover, because of the complexity of such equipment, the dental practitioner may inadvertently apply abruptly an unintended voltage to a patient or to a piece of equipment such as a cautery tool or improperly adjust the controls for administering the required treatment. Also, such equipment, as constructed heretofore, has not been well adapted to overcome the patient's normal fear of having "live" electricity applied to his body.

An object of this invention is to provide improved dental apparatus for selectively applying various electrical treatments such as cautery, pulp testing and electrolysis, such apparatus being priced within the means of the average dental practitioner, in a separate fixture designed for mobility for use in more than one place.

Another object is to provide improved apparatus of the aforesaid character having a single, smoothly graduated, voltage control for use in a variety of operations selected at will.

A further object is to design the apparatus to give the patient a greater feeling of security and a greater degree of control over the dental operation while it is being performed.

A still further object is to provide improved dental apparatus which, in addition to the foregoing functions, is adapted to control an external load by means of the common voltage control.

Still another object is to safeguard the patient against the sharp discomfort such as might be caused by inadvertently switching the apparatus from one type of operation to another without properly readjusting the voltage.

A feature of the invention is the provision of a variable auto-transformer as a common voltage control for a variety of operations, together with a selector switch for choosing the desired operations. This feature greatly reduces the number of controls required for the various operations.

Another feature is the provision of a mechanical interlock between the selector switch and the variable auto-transformer control shaft to prevent the selector switch from being moved except when the auto-transformer is in its "off" position. Likewise, the auto-transformer cannot be moved from its "off" position if the selector switch is between two of its settings.

Still another feature is the provision of rugged stops for positively limiting the rotation of the auto-transformer control shaft at either end of its travel, these stops being included in the interlock mechanism just described. No reliance is placed upon the built-in stops which usually are included in the standard auto-transformer construction and which often are not dependable in service because the control knob may be readily "forced" on the shaft.

A further feature is the provision of a novel hand electrode with a push button therein which enables the patient to signal the dentist his perception of pain resulting from the operation which is being performed upon him.

A still further feature is the adaptability of the apparatus to the control of external equipment such as a dentist's drill or other external load by the patient at the dentist's option.

The foregoing and other objects and features of the invention will be apparent from the following description taken in connection with the accompanying drawings, wherein:

Fig. 1 is a perspective view of a portable dental apparatus constructed in accordance with and embodying the principles of the invention;

Fig. 2 is a cross section of the supporting stand for such apparatus, taken on the line 2—2 in Fig. 1;

Fig. 3 is a perspective view of a detail in the apparatus of Fig. 1;

Fig. 4 is a perspective view similar to Fig. 1, indicating the manner in which the apparatus is used;

Figs. 5 and 6 are perspective views of instruments which may be employed with the disclosed apparatus;

Fig. 7 is a front elevational view of the apparatus proper, with the front panel and control knobs removed therefrom;

Fig. 8 is a fragmentary longitudinal section through the apparatus;

Figs. 9 and 10 are front elevational views similar to Fig. 7, but showing various operative parts of the apparatus in different positions;

Fig. 11 is a fragmentary sectional view showing the means for coupling a control knob to the auto-transformer shaft;

Fig. 14 is a fragmentary perspective view showing the manner in which the instrument for performing electrolysis is used;

Fig. 15 is a simplified circuit diagram of the apparatus; and

Fig. 16 is a more complete circuit diagram of the apparatus.

Figure 12:
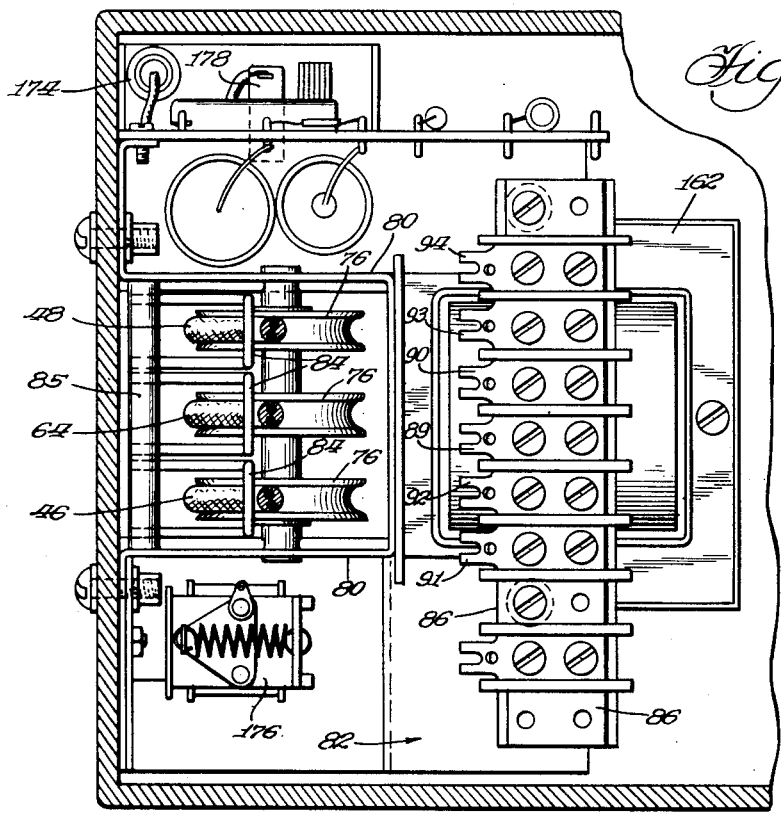
Fig. 12 is a horizontal section on the line 12—12 of Fig. 8.

In practicing the invention, apparatus is provided with three extensible cords, two of which terminate in receptacles for a dental instrument and a dentist's hand lamp, respectively. The receptacle for the dental instrument is adapted to receive a wide variety of instruments for use in the various operations which the apparatus is designed to perform. The third cord carries at its tip a hand electrode with a specially designed push-button switch included therein for the patient's use. This electrode, in addition to its normal function of establishing electrical contact with the patient's body, enables the patient to signal the dentist by flashing a lamp, operating a relay or buzzer, or actually effecting a control operation to interrupt the treatment that is being administered. A selector switch is provided having five positions respectively designated "Electrolysis," "Pulp test No. 1," "Pulp test No. 2," "Cautery," and "External load." For each of these settings there is available a smoothly graduated voltage control, which is provided by a variable auto-transformer which is employed in all operations of the apparatus. The cord leading to the dental instrument is placed in the proper circuit by the selector switch according to the operation which is being performed. A mechanical interlock comprising a cam operated by the knob for adjusting the auto-transformer control shaft, in combination with a detent operated by the knob which actuates the selector switch, prevents the selector switch from being moved except when the variable auto-transformer is in its "off" or zero-voltage position. This cam and detent arrangement also provides positive stops for the auto-transformer control shaft at the limits of its travel.

Having described in a general way the salient features of the invention, the detailed construction of the illustrated embodiment will now be described with reference to the accompanying drawings. Referring first to Fig. 1, the apparatus proper, indicated at 20, preferably is mounted upon a portable stand 22. It should be understood, however, that many features of the invention are not limited to portable equipment, but may be incorporated in fixed installations as well. The stand 22 comprises a base 24 supporting a column 26. The legs of the base 24 are adapted to fit around the pedestal 28 of a standard dental installation, as indicated. In this way, the apparatus 20 may be placed close to the fixed installation so that it can conveniently be manipulated by the dentist, and if desired, the apparatus 20 may have an operative connection with the dentist's drilling equipment under certain circumstances, as will be explained hereinafter.

The apparatus 20 is enclosed by a box-like housing 30, on the front of which is disposed a control panel 32. At the top of the housing, near the front edge thereof, is a horizontal ledge 34, and at the rear of this ledge 34 is a vertical shoulder 36. Two handles 38 and 40, which serve as receptacles for electrical implements, normally are seated in sockets 42 and 44, respectively, which are provided in the shoulder 36. These handles 38 and 40 are of a type commonly used in the dental profession and, as shown best in Fig. 4, they are connected respectively to extensible electric cords 46 and 48. The handle 38 is adapted to receive a dentist's hand lamp 50 which is plugged into the handle 38 and is secured thereto by a standard screw coupling 52. The handle 40 is adapted to receive a dental instrument, such as the cauterizing tool 54 shown in Fig. 4, which is plugged into the handle 40 and is secured thereto by a screw coupling 56.

Other types of tools may be substituted for the cauterizing tool 54, depending upon the particular operation which is to be performed. For example, in Fig. 5 there is shown a probe 58 used in pulp testing. In Fig. 6 there is shown a drying tool. Fig. 14 illustrates an electrolysis attachment. Any of these devices may be substituted for the cauterizing tool 54 shown in Fig. 4.

A hand electrode 62, Figs. 1, 4 and 8, connected to an extensible cord 64 normally is received in a socket 66 in the shoulder 36 as shown in Fig. 1. This electrode 62 is adapted to be grasped in the patient's hand, as indicated in Fig. 4, and in certain operations it forms part of an electrical circuit through the patient's body. A push button 68 is mounted in the end of the electrode 62 for use by the patient under certain conditions, as will be explained more in detail presently.

The front panel 32, of the apparatus 20, as shown in Fig. 1, has a number of control knobs projecting therefrom. The knob 65 designated "Selector" actuates a selector switch of the rotary step type having five positions. For clarity of illustration, these positions are designated 1 to 5, inclusive, opposite the pointer of the knob 65. In actual practice, however, these five positions would be designated on the panel 32 as follows:

1—Electrolysis
2—Pulp test No. 1
3—Pulp test No. 2
4—Cautery
5—External load

A central control knob 67 on the panel 32 has positions designated "off" and "on" and is associated with numerals which indicate various voltage values. This knob 67 actuates a variable auto-transformer control shaft, described hereinafter, and is mechanically interlocked with the selector knob 65 so that the knob 65 cannot be moved except when the knob 67 is in its "off" position.

Still another knob 69, designated "Lamp" regulates the brilliance of the dentist's hand lamp 50, Fig. 4. Also projecting through the front panel 32 are a patient's light 71 and an on-off light 73. The light 71 is used as a signalling device by the patient, and the light 73 indicates whether the apparatus 20 is turned on or off. A small direct-current milliammeter 75 is used in the electrolysis operation of the apparatus 20.

When the apparatus 20 is mounted on the stand 22, the cords 46, 48 and 64 extend down into the interior of the column 22. Each of these cords is supported in substantially the same way, and therefore a description of one, for example, the cord 64, will suffice for all. As shown in Figs. 2 and 3, the cord 64 at its lowermost point is looped beneath a pulley 70 which is journaled between two parallel plates 72. At their lower ends the plates 72 are secured to a lead weight 74. Each of the other two cords 46 and 48, of course, likewise is held down by a pulley 70 bearing a weight such as 74.

As shown in Figs. 8 and 12, one of the two upper ends of each cord as 64 passes around a pulley 76 within the housing 30. There are three pulleys 76, one for each of the cords 46, 48 and 64. These pulleys are mounted loosely on a stationary shaft 78, which extends between and is secured to the sides of a channel-shaped member 80, Figs. 8, 12 and 13, that is part of a chassis generally designated 82 secured within the housing 30 at the rear thereof. Guide rods or wires 84 for the various pulleys 76 and the cords passing thereover are supported by a pin 85 extending between the sides of the channel member 80. The conductors in the upper end of each cord are connected to the respective implement attached to that cord, as the conductors in the cord 64 are connected to the hand electrode 62 in Fig. 8.

The opposite end of each cord as 64 is secured to a terminal block 86, Figs. 8 and 12, mounted on the chassis 82. Thus, in the case of the cord 64, the two conductors 86 and 88 are connected respectively to terminals 89 and 90. Similarly, the conductors in the cord 46 are connected respectively to terminals 91 and 92, and the conductors in the cord 48 are connected respectively to terminals 93 and 94 on the terminal block 86. For mechanical strength, the fixed ends of the cords are secured to the channel member 80 by clamping devices 95, Fig. 8.

As each of the cords 46, 48 and 64 is pulled out (in the manner indicated in Fig. 4), the weighted pulley 70 associated with that cord rises within the column 26, and as the cord is released, the pulley 70 descends to take up the slack. Small separators 96, Figs. 1 and 8, secured in the upper end of the column 26 support vertical guide wires 97, Figs. 2 and 8, which divide the space within the column into three portions to prevent the pulleys 70 from interfering with each other. Preferably, the pulleys 70 are positioned slightly off-center with respect to the weights 74 so that the pulley structures tend to hug the front wall of the column 26. This prevents the weights from bumping and swinging about within the column 26 as they ascend and descend, and keeps the part of the cord having vertical movement with respect to the column from rubbing against the wall of the column.

The upper end of the supporting column 26 is received in the lower end of the channel-shaped member 80, which member adjoins the rear face of the housing 30 as shown in Fig. 8. Small metal strips 98, Figs. 8 and 13, secured to the sides of the channel member 80 rest upon the top edges of the column 26. The channel member 80 grips the column 26 at the upper end thereof and thereby supports the housing 30 on the column 26 without any additional fastening means being required.

If desired, the apparatus 20 may be removed from the upper end of the column 26 and placed upon a table or other supporting surface. For this purpose, small rubber feet 100, Fig. 7, are mounted on the bottom of the housing 30 to rest upon a suitable horizontal supporting surface as indicated at 101. Where the dental apparatus is used in this manner, the weighted cords 46, 48 and 64 are allowed to hang vertically over the edge of the supporting surface, or the full cord is pulled out of the front for temporary use, as when used away from the office.

As shown in Fig. 4, the panel 32 has a transverse lip 102 at the top thereof which seats on the ledge 34 at the top of the housing 30. Conventional cord clips 104 carried by the panel 32 protrude from the lip 102 and are respectively adapted to hold the cords 46 and 48 when the same are inserted under these clips. The junction between the lip 102 and the vertical portion of the panel 32 is rounded, as indicated at 106 in Figs. 1, 4 and 8, so that the cords 46, 48 and 64 will not become frayed by constant rubbing over this edge.

The internal construction of the patient's hand electrode 62 is shown in Fig. 8. The part which is grasped by the patient's hand consists of a metallic tube or shell 108. The conductor 87 in the cord 64 is connected or grounded to the inside of this tube 108. The end of the conductor 88 in the cord 64 is soldered to a fixed contact 110 supported in the center of the tube 108 by an insulating bushing 111. The contact 110 is aligned with a plunger or contact rod 112 which is secured to the push button 68 at the outer end of the electrode 62. Normally a spring 113 coiled about the plunger 112 maintains it separated from the contact 110. When the push button 68 is pressed inwardly, the plunger 112 engages the contact 110, causing an electrical connection to be established from the contact 110 to the plunger 112. The plunger 112 is connected electrically to the tube 108 by a metal collar 114 sliding within this tube.

The conductors 87 and 88 in the cord 64, it will be recalled, are respectively connected to the terminals 89 and 90, Figs. 8, 12 and 16, on the terminal block 86. Hence, whenever the button 68 is pushed in, it serves to bridge these terminals 89 and 90. The effects of such action are described subsequently. At all times when the electrode 62 is grasped by the patient, as indicated in Fig. 4, the patient's hand is connected electrically through the tube 108 and the conductor to the terminal 89. Under certain conditions (namely, in performing Pulp test No. 1) electric current is caused to travel through the patient's body by way of the electrode 62. Under other conditions the electrode 62 is not used for this purpose. In all operations performed upon a patient, however, he or she may be given the electrode 62 to grasp in order that the push button 68 may be manipulated by the patient, to signal the dentist at his or her option.

Behind the front panel 32 of the apparatus 20, there is a panel or partition 116, Fig. 7, which is an integral part of the housing 30. A variable auto-transformer 118, Figs. 7, 13 and 16, which includes a continuous winding 121 that is engaged by a rotary sliding contact 122, is secured to the rear side of panel 116 by mounting screws 120. The contact 122 is actuated by the shaft 123, Figs. 11 and 16, of the auto-transformer 118, and as this contact 122 changes its position, it varies the turns ratio of the transformer 118 to thereby vary the output voltage. The transformer 118 also has an auxiliary or secondary fixed-voltage winding 124, the purpose of which will be described presently.

The knob 67, Fig. 1, which operates the variable auto-transformer 118 is not connected directly to the shaft 123 of this transformer. Instead, as shown in Fig. 11, the knob 67 is secured to a stub shaft 125 which extends through an opening in the front panel 32. The shaft 125 has an enlarged end portion which is recessed to receive the forward end of the auto-transformer sliding contact shaft 123, forming a collar 126 about the shaft 123. The collar 126 is secured to the shaft 123 by a set screw 127. A cam 130, Figs. 7 and 11, is integral with the shaft 125 and with the collar 126. This cam 130 has a uniform diameter along the major portion of its periphery. Positioned adjacent to the cam 130 is a detent 131 which is secured to the end of a short lever arm 132 pivotally mounted at 133 on the panel 116. The detent 131 is adapted to be received in a notch 134 formed in the periphery of the cam 130. A pin 135, Figs. 7 and 11, secured to the detent 131 cooperates with a sector-shaped cam 136 which is secured to the shaft 137 of a selector switch generally designated 138. The shaft 137 of the switch 138 projects through the front panel 32 and is secured to the selector knob 65. A spring 139 acting upon the arm 132 maintains the pin 135 seated on the cam 136 at all times.

The selector switch 138 is employed to select the type of electrical current supply which is required by the fitting being used in handle 40. It is a rotary step type of switch having five different positions to which it may be adjusted. The cam 136 has in its periphery a series of five notches, separated by intervening teeth 142, which are adapted to cooperate with the pin 135 in the detent 131. In order to change the setting of the selector switch 138, the notch 134 in the cam 130 must be in registry with the detent 131. Then, as the shaft 137 of the selector switch 138 is turned, the detent 131 rides up over the adjacent tooth 142, as shown in Fig. 10, causing the detent 131 to enter the notch 134. As the pin 135 enters the next notch, the detent 131 drops back into its normal position shown in Fig. 7.

The notch 134 in the cam 130 is aligned with the detent 131 only when the control knob 67, Fig. 1, is in its "off" position. Hence, the setting of the selector knob 65 can be changed only when the auto-transformer 118 is switched off. For any other position of the control knob 67, the notch 134 is not registered with the detent 131. Such a condition is illustrated in Fig. 9. The detent 131 then encounters the periphery of the cam 130 and prevents the pin 135 from riding up over any of the teeth 142 on the cam 136. The position of the cam 136, and hence that of the selector switch 138, cannot be altered so long as the cam 130 and detent 131 are in such relative positions. This insures that the apparatus 20 must be switched off before any change in the setting of the selector is made insuring that with each change of fittings in handle 40, the voltage applied will begin at zero and be advanced smoothly to the desired strength. Long teeth 144 at opposite ends of the sector-shaped cam 136 limit the rotation of this cam relative to the pin 135.

The detent 131 also serves as a stop for the control shaft of the auto-transformer 118 at opposite ends of the latter's travel. Thus, referring to Fig. 7, the cam 130 has a shoulder 146 adjacent the notch 134 which abuts the detent 131 when the auto-transformer control shaft 123 is turned to its "off" position. At the other end of the travel of this shaft, the detent 131 is engaged by a tooth 147 on the cam 130, thus preventing any further rotation of the cam 130 and arresting the auto-transformer control shaft in its maximum-voltage position. These special stops are more reliable than the standard stops on variable auto-transformers of the same type in that the stops can readily be forced and rendered useless.

For switching the apparatus 20 on and off, a switch 150, Fig. 7, is located adjacent the cam 130. A roller 151 cooperating with the periphery of the cam 130 operates the switch 150. When the selector knob 67, Fig. 1, is in its "off" position the follower 151 is engaged by the tooth 147 on the cam 130, and the switch 150 is opened. As the selector knob 67 is turned to its "on" position, the follower 151 rides off of the tooth 147, as indicated in Fig. 9, and the switch 150 closes, thence remaining closed throughout the continued rotation of the control knob 67.

Figure 13:
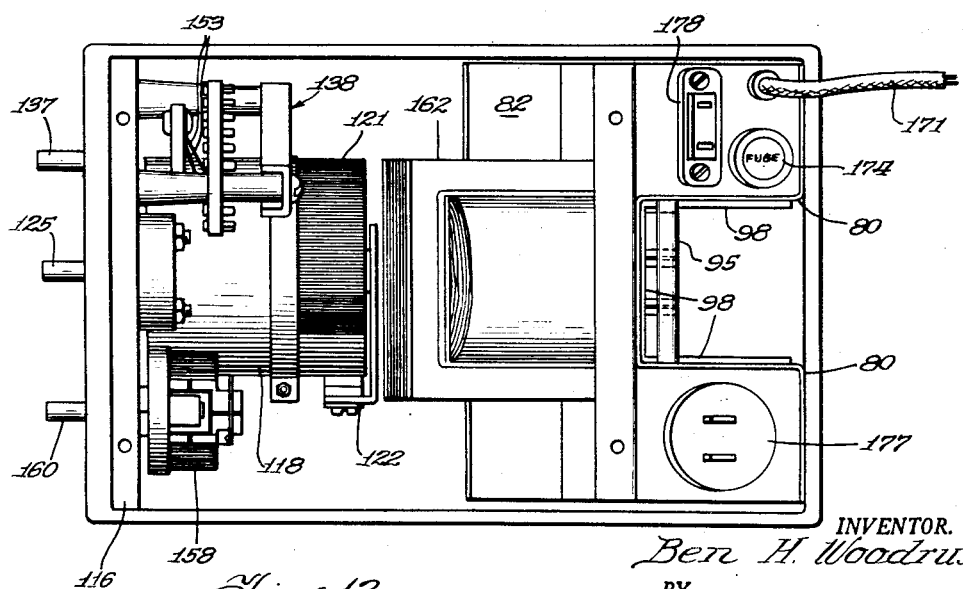
Fig. 13 is a bottom view of the apparatus proper.

The selector switch 138, Figs. 7, 13 and 16, has a rotor portion secured to the shaft 137 and a stator portion which is secured to the rear side of the panel 116. As shown best in Fig. 16, the stator portion of the switch 138 has three segmental contact strips A, B and C, each of which is adapted to be electrically connected to any of a series of stationary contacts as A1, A2, etc., or B1, B2, etc., or C1, C2, etc. Pairs of sliding contacts 153 on the switch rotor cooperate respectively with the contact segments A, B and C, and their respective stationary contacts. The contact segments A, B and C and the various individual contacts as A1, A2, etc., are electrically connected to various parts of the circuit shown in Fig. 16. Thus, the segment A is connected by a conductor 154 to the sliding contact 122 of the auto-transformer 118. A common conductor 155 connects segments B and C electrically to one of the terminals 94 to which the instrument handle 40, Fig. 4, is connected. The detailed circuit connections for the remaining contacts of the switch 138 will be explained in connection with the operation of the apparatus.

Also mounted on the panel 116 is a rheostat 158, Figs. 13 and 16, the sliding contact 159 of which is connected to a shaft 160 that protrudes through the front panel 32 and is secured to the knob 69, Fig. 1. The rheostat 158 is connected in series with the low-voltage auxiliary winding 124 on the auto-transformer 118 and with the terminals 91 and 92 that are connected to the handle 35, Fig. 4, which receives the dentist's hand lamp 50. By means of the rheostat 158, the intensity of the lamp 50 is regulated.

The patient's light 71 and the on-off light 73, Figs. 1 and 7, are received in suitable bayonet sockets (not shown) mounted on the rear of the panel 116. Mounted on the front of the panel 116, in the vicinity of the lights 71 and 73, respectively, are internally threaded bushings 161. These bushings 161 are adapted to receive threaded bezels 163 (partially illustrated in Fig. 1) which extend through holes in the front panel 32 and serve to hold this panel in place. Transparent hemispherical plastic covers for the lights 71 and 73 are mounted on the bezels 163.

Mounted on the chassis 82 is a transformer 162, Figs. 12, 13 and 16, having a primary winding 164 and three secondary windings 166, 167 and 168. The primary 164 is connected on one end thereof to a conductor or line wire 170 in the power cord 171. The other end of the winding 164 is connected by a conductor 172 to the contacts A1, A2, A3 and A4 on the selector switch 138. Hence, the winding 164 of the transformer 162 is connected in series with the sliding contactor 122 of the auto-transformer 118 whenever the selector switch 138 is in any of its positions 1 to 4. The auto-transformer winding 121 is connected at one end thereof by a conductor 173 to the line-voltage conductor 170. The other end of the winding 121 is connected through the on-off switch 150 (when closed) and through a fuse 174 to the other line-voltage conductor 175 in the cord 171.

Also mounted on the chassis 82 are a relay 176, a plug 177 and a receptacle 178. The terminals of the plug 177 normally are bridged by the contact 179 of the relay 176. The plug 177 may be inserted into any external circuit that the patient may desire to interrupt, for example the work circuit of the dentist's drill. The relay 176 is controlled by the push button in the patient's hand electrode 62, as explained in greater detail presently. When the push button is closed, the relay 176 is energized and opens its contact 179 to break the circuit in which the plug 177 is located, and provides an audible signal. The receptacle 178 is adapted for connection to any external load which is to be controlled by the auto-transformer 118. This operation likewise will be explained hereinafter.

OPERATION

The operation of the illustrated machine will be described principally with reference to the five different positions or settings of the selector switch 138, Fig. 16, actuated by the selector knob 65, Fig. 1. First, however, consideration will be given to several preliminary matters respecting the operation of the machine.

The machine must be turned "off" before the function supplied by handle 40 may be changed. When the control knob 67, Fig. 1, is in its "off" position, as mentioned above, the selector knob 65 may be turned to the desired position. The control knob 67 then is turned on, causing the switch 150, Fig. 16, to close. This establishes a circuit for energizing the winding 121 of the variable auto-transformer 118. The output voltage derived from this winding is determined by the setting of the sliding contact 122, which is actuated by the control knob 67.

When the auto-transformer 118 is energized, its auxiliary or secondary winding 124 develops a small output voltage of, say, 6 volts. This is employed to operate the hand lamp 50 (Fig. 4) under the control only of the rheostat knob 69, and it also operates the patient's light 71 and the relay 176 under the control of the push button 68 (Fig. 4) in the patient's hand electrode 62.

As another incident to switching the apparatus on, a circuit is closed from the line 171 through the switch 150 to a neon lamp 73 which serves as the on-off light.

*Functions of hand electrode*

The outer contact portion or shell 108 of the patient's hand electrode 62, Figs. 4 and 8, has a permanent electrical connection to the terminal 89, Fig. 16, on the chassis 82. The center contact 110 of the electrode 62 is connected to the companion terminal 90. For any of the various types of treatments administered to the patient, the patient has control of the light 71 and the relay 176. Whenever the patient presses the button 68 on the electrode 62, the light 71 flashes and the relay 176 opens the external circuit making an audible click. In this way the patient is able to signal the dentist. The relay 176 may be used also to govern other dental equipment such as a drill. Thus, if the drill is causing pain, the patient merely presses the button 68, thereby interrupting the work circuit of the drill and stopping the drill.

A highly advantageous feature of the hand electrode 62 arises from the fact that it has a use entirely independent of its function as an electrode. That is to say, the patient must grasp the electrode 62 in order to operate the push button 68 by which he signals the dentist. This tends to direct the patient's attention away from the fact that the electrode 62, under certain conditions, actually establishes a circuit through the patent's body. (This function of electrode 62 is utilized only when performing Pulp test No. 1, described below.) Not all patients object to the idea of grasping a "live" electrode, but in the case of those patients who are likely to have such objections, the dentist need call attention only to the function of the push button 68 carried by the electrode 62 and intentionally omit to mention any other purpose of the electrode 62, if he deems such a procedure advisable.

The push button 68 may be used also to indicate loss of consciousness when a general anesthetic is being administered to the patient. This can be accomplished by having the patient continuously push the button in and release it. When the patient becomes unconscious, he will stop actuating the button.

*Circuit diagrams—Figs. 15 and 16*

In the different types of operations described below, reference will be had primarily to the circuit diagrams, Figs. 15 and 16. Fig. 15 illustrates the electrical design in a simple block diagram, while Fig. 16 shows more of the details of the various circuits involved. Corresponding elements are identified by like reference characters in the two views.

*Electrolysis*

In the electrolysis operation, the rotor of the selector switch 138 is placed in position 1. The standard fitting illustrated in Fig. 14 is inserted in the instrument handle 40. This operation entails probing the root canal of a tooth with a fine wire 184 which is charged with a direct-current potential, and observing the corresponding readings of the milliammeter 75.

The probing wire 184 is inserted in a chuck 186 in an extension handle 188 which is connected by a conductor 189 to one of the contacts in the coupling 56. This coupling 56 is connected to the handle or receptacle 40 on the instrument cord 48, as described above. The other contact of the coupling 56 is connected by a conductor 190 to an electrode 192 mounted on a U-shaped spring clamp 193 that is adapted to fit on the patient's hand.

For supplying the direct current used in the electrolysis operation, there is provided on the chassis 82 a rectifier-filter network 195 (best shown in Fig. 16) comprising a selenium rectifier 196 and an associated resistance-capacitance filter. This rectifier-filter network is energized by the secondary winding 166 on the transformer 162. The primary winding 164 of this transformer is connected through the contact A1 of the selector switch 138 to the rotor of the variable auto-transformer 118, whereby the rectified direct-current output voltage may be regulated. The negative terminal of the filter network 198 is connected by conductors 200 and 202 to the cord terminal 93, to which one of the conductors in the cord 48, Fig. 14, is connected. The positive terminal of the filter network 198 is connected by a conductor 204 to a terminal 205 on the milliammeter 75. The other terminal 206 of this meter is connected by a conductor 207 to the stationary contact B1 on the selector switch 138, and thence through this switch and the conductor 155 to the other instrument terminal 94. A direct-current voltage, therefore, is established between the probing wire 184 and the hand electrode 192, Fig. 14, and the meter 75 indicates the flow of current through the patient's body as the wire 184 is used in the root canal, for electrolysis of the medication placed therein, observing the required polarity as determined by the medication.

Pulp test No. 1

In this operation a pulp testing tool such as 58, Fig. 5, is inserted in the handle 40, Fig. 4, and is applied to the tooth that is being tested. This test requires that alternating current flow through the patient's body between the pulp testing tool and the hand electrode 62 which is grasped by the patient.

The selector switch 138, Fig. 16, is placed in position 2 for this test. The alternating voltage for this test is furnished by a secondary winding 167 of the transformer 162. The primary winding 164 is connected through the selector switch contact A2 to the output terminal of the variable auto-transformer 118, whereby the output voltage of the secondary winding 167 is controlled. One side of the secondary winding 167 is connected by a conductor 208 to the cord terminal 89 which is electrically connected to the outer shell of the hand electrode 62. The other side of the winding 167 is connected by a conductor 210 to the stationary contact B2 of the selector switch 138, thence through this switch and the conductor 155 to one of the instrument terminals 94. A circuit likewise is completed from the terminal B2 through the terminal C2 and a conductor 212 to the other instrument terminal 93. Hence, in this operation, the two instrument terminals are connected in parallel to the same side of the voltage source 167, and the hand electrode 62 is connected to the other side of this voltage source. In conducting the test, the patient is directed to grasp the push-button type hand electrode with instructions to signal by pushing the button as soon as a slight warm sensation is felt in the tooth to be tested. The dentist then carefully dries the tooth to prevent sensations in adjoining tooth structures and places the tooth electrode at a suitable point on the tooth structure, taking care to avoid touching any metal filling. To establish better contact between the electrode tip or tips and the tooth surface, a small amount of tooth paste may be applied to the electrode tips. The dentist then slowly and smoothly rotates knob 67 from the zero position towards the right or the 100 mark. If the patient signals at any time during this rotation of knob 67 the dentist immediately returns knob 67 to zero, and then removes the electrode from the tooth surface. The tooth electrode should never be lifted from contact with the tooth while a test voltage is being applied as the breaking of the circuit may shock the patient slightly.

Pulp test No. 2

In this test the tool 58, Fig. 5, is employed, and an alternating voltage is set up between the two prongs 214 and 215 of this tool. The hand electrode 62 is not included in the circuit.

The selector switch 138 is placed in position 3 for this pulp test. The voltage source for the test is the secondary winding 166 of the transformer 162. One end of this secondary winding is connected through conductors 200 and 202 to one of the instrument terminals 93. The other end of the winding 166 is connected through a conductor 216, switch contact B3 and the selector switch 138 to the other instrument terminal 94. Hence, the alternating-current output voltage of the transformer winding 166, as controlled by the setting of the variable auto-transformer 118, is applied to the terminals 93 and 94, which in this instance are connected respectively to the prongs 214 and 215 of the instrument 58, Fig. 5. The test procedure described in the description of Pulp test No. 1 is then followed. In this test, the use of the hand electrode is optional as it serves only as a signal means for the patient.

Cautery

The selector knob 65, Fig. 4, controlling the selector switch 138, Fig. 16, is placed in position 4. A cauterizing tool such as 54 is inserted in the instrument handle 40. Low-voltage alternating current is passed through the exposed wire 220 of the tool 54 to heat this wire for application to the patient's gum or other oral part.

The alternating voltage for the cauterizing implement is furnished by the secondary winding 168 of the transformer 162, Fig. 16. As in the preceding operations, the primary 164 of this transformer is connected through a switch contact A4 and the selector switch 138 to the output terminal of the variable auto-transformer 118 for regulating the flow of current through the cautering tool 54. One end of the secondary winding 168 is connected through the conductor 202 to one of the instrument terminals 93. The other end of the winding 168 is connected through a conductor 222, switch contacts B4 and C4 and conductor 155 to the other instrument terminal 94.

Drying

Occasionally it is desired to use an electrically heated drying tool such as 60, Fig. 6, for warming guttapercha or for a similar purpose. This operation is performed with the selector in position 4, as in the cautery operation. The dryer 60 is inserted in the handle 40 in place of the cautery instrument 54. The tool 60 has a ball point applicator 224 which is a ballpoint heating tool used by dentists to soften such materials as guttapercha. Other fittings, electrically adaptable, such as a root canal drying needle, may also be used.

External load

There may be occasions when it is desired to use the variable auto-transformer 118 for regulating the voltage applied to an external load such as an X-ray examination lamp which is a small illuminator for viewing dental X-ray films, or a microscope illuminator. This can be done by moving the selector switch into position 5 and plugging the external load into the receptacle 178, Figs. 13 and 16. This causes the output terminal of the auto-transformer 118 to be connected through the conductor 154, switch contact A5 and conductor 226 to one terminal of the receptacle 178. The other terminal of this receptacle is connected directly to the line conductor 170.

SUMMARY

The illustrated dental apparatus is small, compact and economical, and is especially suitable for use as an adjunct to the standard fixed drill installation. If desired, it may be designed also for inclusion in a fixed installation. It is adapted to administer any of four different types of electrical treatments to a patient, or it may be used for controlling an external load. In each one of these applications a variable auto-transformer is used to provide a stepless voltage control which is superior to the rheostats and tap switches used as controls heretofore in the dental field. By employing a single control of this nature which is common to all of the various operations performed by the apparatus, the cost of the control is made a small portion of the total cost, instead of being a major item as would be the case if a separate control were used for each operation.

The patient has the advantage that he can signal the dentist at will by means of the push button 68 on the hand electrode 62. This same electrode also serves to establish an electrical circuit for pulp testing by method No. 1. The machine provides for both types of pulp testing, one in which a substantial part of the patient's body is included in the electrical circuit, and the other in which the circuit is confined to the patient's tooth. The patient also can be given control of a dental operation to the extent that he completely interrupts the operation by merely pressing the push button. This feature can be used to control the operation of a drill, for example. The apparatus is adapted for use also to provide smooth voltage variation for an external load such as an X-ray examination lamp or a microscope illuminator.

The control knob 67 and the selector knob 65 are interlocked in a novel maner so that the selector knob 65 cannot be moved to change the type of operation unless the selector knob 67 is first turned "off," then advanced smoothly from zero to the desired current intensity. Also, if the selector knob 65 should inadvertently be left between two of its positions, the control knob 67 cannot be moved away from its "off" position. The interlock mechanism is utilized also for limiting the rotation of the variable auto-transformer control shaft. The standard stops which are furnished with such transformers ordinarily have a tendency to fail while in service. The present invention safeguards the transformer from such abuse. It will be noted also (Fig. 11) that the selector knob 67 is not mounted directly upon the auto-transformer shaft 123, but upon an auxiliary shaft 125 integral with the cam 130 which is arrested by the detent 131 at the limit of travel of the control knob 67. Hence, no strain whatever is placed upon the auto-transformer shaft 123. The control knob 67 has the additional function of turning the main power switch 160 on and off.

Many modifications of the illustrated embodiments are possible without departing from the principles of the present invention, and the appended claims therefore should not be construed to have any limitations other than those expressly set forth therein.

I claim:

1. Dental apparatus adapted to be used with instruments of various kinds with various electrical loads and for applying a variable voltage to any of the various loads, comprising a transformer with variable turns ratio and having a control shaft rotatably adjustable to various positions for providing smoothly graduated output voltages, coupling means between said transformer and the load including a selector switch rotatably movable into various positions for coupling said transformer selectively to the respective loads, and interlock means enabling said switch to be moved only when said transformer control shaft is in a predetermined position said interlock means comprising a cam plate adapted to rotate with said control shaft, said cam plate having an indentation, and a lever element interconnected with the selector switch to move into said indentation when said selector switch is rotated, said cam plate being angularly related to the rotary position of said transformer control shaft to prevent movement of said lever element unless said control shaft is in a predetermined position.

2. Electrical apparatus for applying a variable voltage to any of a plurality of loads, comprising a transformer with variable turns ratio adjustable to various positions for providing smoothly graduated output voltages, a rotatable power switch mechanically coupled to by a rotatable shaft to said transformer for adjusting the turns ratio thereof and effective to prevent the energization of said transformer when said rotatable shaft is in a predetermined position, coupling means between said transformer and the loads including a selector switch rotatably movable into various positions for coupling said transformer selectively to the respective loads, and interlock means enabling said selector switch to be moved only when said rotatable shaft is in said predetermined position thereof said interlock means comprising a cam plate adapted to rotate with said rotatable shaft, said cam plate having an indentation, and a lever element interconnected with the selector switch to move into said indentation when said selector switch is rotated, said cam plate being angularly related to the rotary position of said rotatable shaft to prevent movement of said lever element unless said control shaft is in a predetermined position.

3. Electrical apparatus for supplying variable voltages selectively to various utilization circuits, comprising a variable auto-transformer having an operating shaft for adjusting the output voltage of said auto-transformer, coupling means including a selector switch for selectively coupling said auto-transformer electrically to the various utilization circuits, said selector switch having an operating shaft therefor to position said switch selectively, and an interlock mechanism between said operating shafts including a first cam mounted on said auto-transformer shaft, a second cam mounted on said selector switch shaft, and a pivoted detent having a portion thereof engageable with said first cam and another portion thereof following said second cam, said second cam having a series of projections thereon engageable with said follower portions to pivot said detent whenever the setting of said selector switch is being changed, and said first cam having portions thereof to permit such pivoting movement of said detent when said auto-transformer operating shaft is in a minimum-voltage position and to prevent such pivotal movement of said detent when said auto-transformer operating shaft is not in a minimum-voltage position.

4. An apparatus as set forth in the preceding claim, wherein said first cam also has stop portions alternatively engageable with said detent to limit the rotation of said auto-transformer shaft.

5. A variable auto-transformer structure comprising a stationary arcuate winding, a rotary contact cooperating with said winding, an operating shaft for positioning said contact relative to said winding, a rotatable device adapted for attachment to one end of said operating shaft for manipulating said shaft, said device including a member having a diameter larger than the manipulating or handle portion of said device, said member having a stop portion rotatable therewith, and a detent cooperating with said stop portion to limit the rotation of said device, thereby limiting the rotation of said auto-transformer shaft.

BEN H. WOODRUFF.

References Cited in the file of this patent

UNITED STATES PATENTS

| Number | Name | Date |
| --- | --- | --- |
| 566,103 | Waite | Aug. 18, 1896 |
| 728,575 | Hill et al. | May 19, 1903 |
| 774,760 | Kinraide | Nov. 15, 1904 |
| 1,012,326 | Campbell | Dec. 19, 1911 |
| 1,194,243 | Schultze | Aug. 8, 1916 |
| 1,242,778 | Darling | Oct. 9, 1917 |
| 1,548,184 | Cameron | Aug. 4, 1925 |
| 1,695,485 | Fayer | Dec. 18, 1928 |
| 2,009,013 | Karplus | July 23, 1935 |
| 2,107,057 | Liebel et al. | Feb. 1, 1938 |
| 2,290,688 | Landauer | July 21, 1942 |